U S010253632B2

United States Patent
Lyons

(10) Patent No.: US 10,253,632 B2
(45) Date of Patent: Apr. 9, 2019

(54) COMPRESSOR RIM THERMAL MANAGEMENT

(71) Applicant: United Technologies Corporation, Hartford, CT (US)

(72) Inventor: Christopher B. Lyons, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 305 days.

(21) Appl. No.: 15/104,061

(22) PCT Filed: Dec. 18, 2014

(86) PCT No.: PCT/US2014/071261
§ 371 (c)(1),
(2) Date: Jun. 13, 2016

(87) PCT Pub. No.: WO2015/138031
PCT Pub. Date: Sep. 17, 2015

(65) Prior Publication Data
US 2016/0312615 A1    Oct. 27, 2016

Related U.S. Application Data

(60) Provisional application No. 61/921,823, filed on Dec. 30, 2013.

(51) Int. Cl.
*F02C 7/12*       (2006.01)
*F01D 5/08*       (2006.01)
(Continued)

(52) U.S. Cl.
CPC ............. *F01D 5/081* (2013.01); *F01D 9/065* (2013.01); *F01D 25/24* (2013.01); *F02C 3/04* (2013.01);
(Continued)

(58) Field of Classification Search
CPC .......... F01D 5/081; F01D 9/065; F01D 25/24; F02C 3/04; F02C 7/185; F05D 2220/32;
(Continued)

(56) References Cited

U.S. PATENT DOCUMENTS 3,452,542 A    7/1969  Saferstein et al.
4,893,984 A *  1/1990  Davison .................. F01D 11/24
                                                          415/116

(Continued)

OTHER PUBLICATIONS

Extended European Search Report fro EP Application No. 14885609. 9, dated Dec. 1, 2016, 7 Pages.
(Continued)

*Primary Examiner* — Jesse S Bogue
(74) *Attorney, Agent, or Firm* — Kinney & Lange, P.A.

(57) ABSTRACT

A flow system for use in a gas turbine engine includes a diffuser case strut defining a first opening at a first radial end, a second opening at a second radial end, and a strut passage radially therethrough between the first and second openings. A first chamber wall and a second chamber wall define a first mixing chamber disposed radially inward of the diffuser case strut in fluid communication with the strut passage. A third chamber wall extends between the second flowpath wall and the second chamber wall to define a second mixing chamber disposed between the diffuser case strut and the first mixing chamber. The second flowpath wall and the second chamber wall are shaped to form a venturi in the second mixing chamber.

14 Claims, 3 Drawing Sheets

(51) Int. Cl.
*F01D 9/06* (2006.01)
*F02C 7/18* (2006.01)
*F01D 25/24* (2006.01)
*F02C 3/04* (2006.01)

(52) U.S. Cl.
CPC .......... *F02C 7/185* (2013.01); *F05D 2220/32* (2013.01); *F05D 2260/213* (2013.01); *F05D 2260/601* (2013.01); *Y02T 50/676* (2013.01)

(58) Field of Classification Search
CPC ......... F05D 2260/213; F05D 2260/601; Y02T 50/676
See application file for complete search history.

(56) References Cited

U.S. PATENT DOCUMENTS

| | | | |
|---|---|---|---|
| 5,154,048 A | | 10/1992 | Ponziani et al. |
| 5,163,285 A | * | 11/1992 | Mazeaud .................. F01D 5/08 60/806 |
| 5,212,940 A | * | 5/1993 | Glover .................... F01D 11/20 415/115 |
| 5,269,133 A | * | 12/1993 | Wallace .................. F02C 7/185 165/142 |
| 5,297,386 A | * | 3/1994 | Kervistin ................ F01D 11/24 415/115 |
| 5,417,057 A | | 5/1995 | Robey |
| 5,515,680 A | | 5/1996 | Fujimura et al. |
| 6,468,032 B2 | * | 10/2002 | Patel ...................... F01D 5/081 415/115 |
| 6,672,072 B1 | | 1/2004 | Giffin, III |
| 8,371,127 B2 | * | 2/2013 | Durocher ................ F01D 5/082 415/115 |
| 8,869,538 B2 | * | 10/2014 | Nanda .................... F01D 25/14 60/785 |
| 2005/0022535 A1 | | 2/2005 | Palmisano et al. |
| 2006/0213202 A1 | | 9/2006 | Fukutani |

OTHER PUBLICATIONS

International Preliminary Report on Patentability, for PCT Application No. PCT/US2014/071261, dated Jul. 14, 2016, 7 pages.
International Search Report and Written Opinion for Application Serial No. PCT/US2014/071261, dated Sep. 25, 2015, 8 pages.

\* cited by examiner

COMPRESSOR RIM THERMAL MANAGEMENT

STATEMENT OF GOVERNMENT INTEREST

This invention was made with government support under Contract No. FA8650-09-D-2923 awarded by the United States Air Force. The Government has certain rights in this invention.

BACKGROUND

The described subject matter relates generally to turbine engines, and more specifically, to diffuser cases and compressor cooling for turbine engines.

When used on aircraft, gas turbine engines typically include a fan delivering air into a bypass duct and into a compressor section. Air from the compressor is passed downstream into a combustion section where it is mixed with fuel and ignited. Products of this combustion pass downstream over turbine rotors driving them to rotate. Turbine rotors drive the compressor and fan rotors.

Continued increases in efficiency can cause compressor temperature to approach desired limits, particularly at the far end thereof. Repeated exposure to such excess temperatures can shorten the life of compressor components, particularly the compressor rim and other components at the last or aft most stage of a high pressure compressor. Thus, improvements in temperature control of compressor components are desired in the art.

SUMMARY

A flow system for use in a gas turbine engine includes a diffuser case strut defining a first opening at a first radial end, a second opening at a second radial end, and a strut passage radially therethrough between the first and second openings. A first chamber wall and a second chamber wall define a first mixing chamber disposed radially inward of the diffuser case strut in fluid communication with the strut passage. A third chamber wall extends between the second flowpath wall and the second chamber wall to define a second mixing chamber disposed between the diffuser case strut and the first mixing chamber. The second flowpath wall and the second chamber wall are shaped to form a venturi in the second mixing chamber.

An engine includes a compressor section, a combustor section, and a turbine section defining a core flow passage, along with a diffuser case, and a secondary flow system. The diffuser case includes a plurality of diffuser case struts positioned in the core flow passage radially between inner and outer case supports. The secondary flow system includes a plurality of diffuser case strut passages extending radially through at least some of the diffuser case struts. Each strut passage has a first opening at a first radial end and a second opening at a second radial end. A first chamber wall and a second chamber wall define a first mixing chamber disposed radially inward of the diffuser case struts and in fluid communication with the strut passages. A third chamber wall extends between the second diffuser flowpath wall and the second chamber wall to define a second mixing chamber disposed between the diffuser case strut and the first mixing chamber. The second flowpath wall and the second chamber wall are shaped to form a venturi in the second mixing chamber, and the venturi includes a neck portion disposed between a converging portion and a diverging portion.

DETAILED DESCRIPTION

Figure 1:
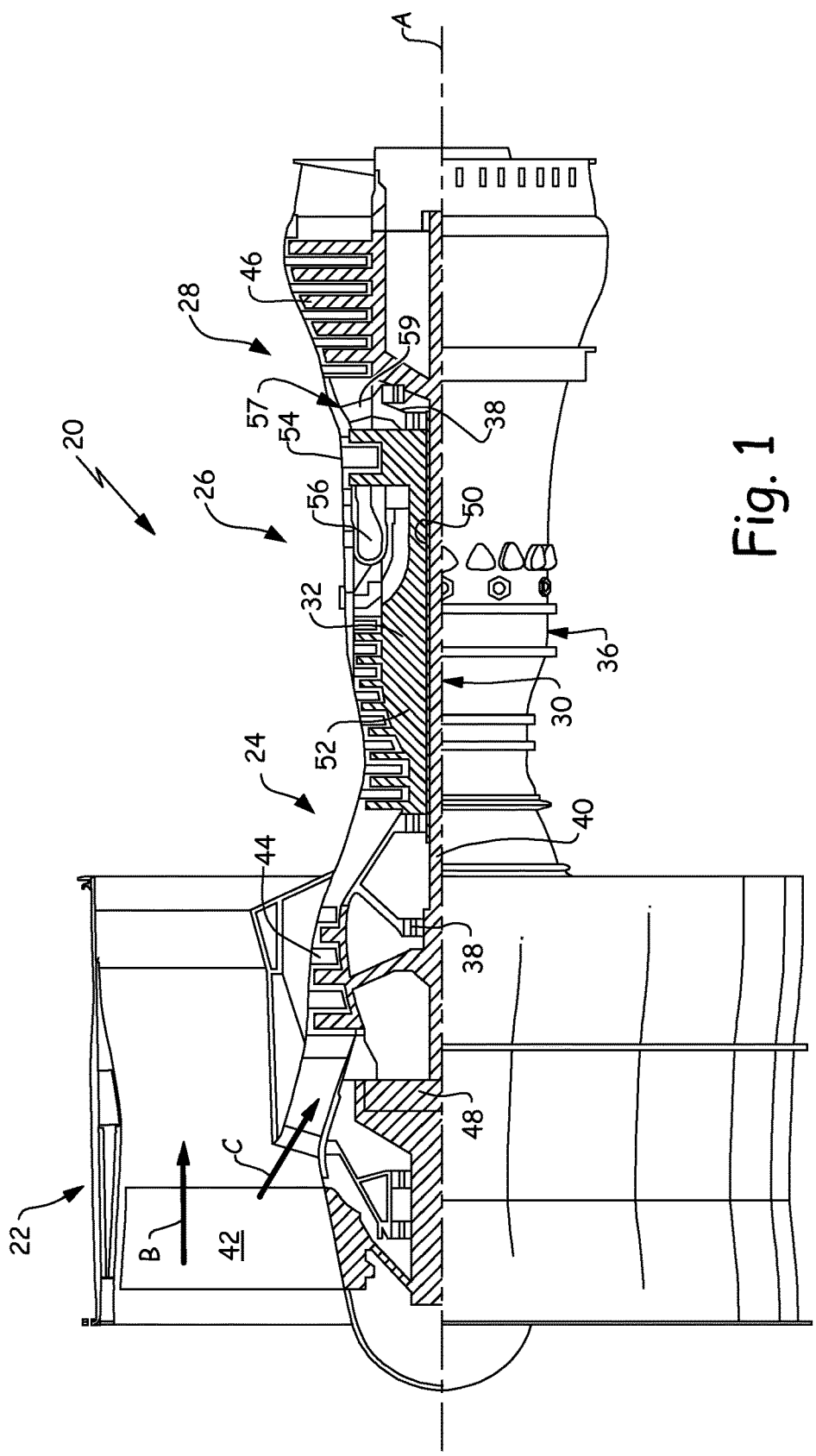
FIG. 1 is a cross-sectional view of a gas turbine engine.

FIG. 1 schematically depicts gas turbine engine 20. Historically, the fan rotor was driven at the same speed as a turbine rotor. More recently, it has been proposed to include various gear reduction schemes to optimize efficiency of both the fan and the compressor. This generally allows for increased fan diameters and resultant increases in the volume of air delivered into the bypass duct relative to the power core. With increased bypass ratios, it becomes more important to efficiently utilize the air delivered to the compressor.

Engine 20 generally includes fan section 22, compressor section 24, a combustor section 26 and turbine section 28. Alternative engine designs can include an augmenter section (not shown) among other systems or features. Fan section 22 drives air along bypass flowpath B, while compressor section 24 drives air along core flowpath C for compression and communication into combustor section 26 and expansion of combustion gases through turbine section 28. Although depicted as a two-spool turbofan gas turbine engine in the disclosed non-limiting embodiment, it should be understood that the concepts described herein are not limited to use with turbofans as the teachings may be applied to other types of turbine engines including three-spool architectures.

Engine 20 generally includes low speedspool 30 and high speed spool 32 mounted for rotation about an engine central longitudinal axis A relative to engine static structure 36 via several bearing systems 38. It should be understood that various bearing systems 38 at various locations may alternatively or additionally be provided.

Low speed spool 30 generally includes inner shaft 40 that interconnects fan 42, low pressure compressor 44 and low pressure turbine 46. Inner shaft 40 is connected to fan 42 through geared architecture 48 to drive fan 42 at a lower speed than the low speed spool 30. High speed spool 32 includes outer shaft 50 that interconnects high pressure compressor 52 and high pressure turbine 54. Combustor 56 is arranged between, and is in flow communication with, high pressure compressor 52 and high pressure turbine 54. Midturbine frame 57 of engine static structure 36 is arranged generally between high pressure turbine 54 and low pressure turbine 46. Midturbine frame 57 further supports bearing systems 38 in turbine section 28. Inner shaft 40 and outer shaft 50 are concentric and rotate via bearing systems 38 about engine central longitudinal axis A which is collinear with their longitudinal axes.

The core airflow is compressed by low pressure compressor 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive respective low speed spool 30 and high speed spool 32 in response to the expansion.

Engine 20 is in one example a high-bypass geared aircraft engine. In a further example, the engine 20 bypass ratio is greater than about six (6), with an example embodiment being greater than ten (10), the geared architecture 48 is an epicyclic gear train (such as a planetary gear system or other gear system) with a gear reduction ratio of greater than about 2.3, and the low pressure turbine 46 has a pressure ratio that is greater than about five (5). In one disclosed embodiment, the engine 20 bypass ratio is greater than about ten (10:1), the fan 42 diameter is significantly larger than that of low pressure compressor 44, and low pressure turbine 46 has a pressure ratio that is greater than about five (5:1). Low pressure turbine 46 pressure ratio is pressure measured prior to inlet of low pressure turbine 46 as related to the pressure at the outlet of low pressure turbine 46 prior to an exhaust nozzle. Geared architecture 48 may be an epicyclic gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. Fan section 22 of engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of $lb_m$ of fuel being burned divided by $lb_f$ of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(T_{ram}\ °\ R)/(518.7°\ R)]^{0.5}$. The "Low corrected fan tip speed" as disclosed herein according to one non-limiting embodiment is less than about 1150 ft/second.

High pressure at the exit of a high pressure compressor also results in a high temperature increase. The temperature at the exit of the high pressure compressor is sometimes referred to as $T_3$. As $T_3$ (compressor discharge temperature) increases, the rear stages of the compressor become more thermally stressed, requiring cooling to compensate. When this compressed air exceeds the capabilities of the compressor materials, typically titanium alloys damage can occur.

In response, a compressor on-board injection (COBI) system was designed to receive cooled air from a heat exchanger in a cooled air system and uses the cooled air to cool the last stage of the compressor and the compressor rotor rim. There can be geometric limits to efficiently feeding a COBI or other compressor cooling installations, particularly when the overall axial length of the engine power core is constrained.

FIG. 2A schematically illustrates portions of an example turbine engine, such as engine 20 shown in FIG. 1. Following the example engine 20, an aft, or downstream, portion of high pressure compressor (HPC) 44 includes rotor blades 62 connected to rotor disks 64. Exit guide vane (EGV) 66 is disposed in core flowpath C immediately aft of the illustrated rotor portion of HPC 44.

EGVs 66 can be distributed circumferentially around engine axis A in the downstream portion of HPC 44, and are adapted to condition compressed gas exiting HPC 44 prior to entering combustor 56 (shown in FIG. 1). Cooling is provided by secondary air system 67, at least a portion of which is defined in and around inner diffuser case 68 as described below.

Immediately aft of EGVs 66, inner diffuser case 68 is positioned across gas flowpath C, and mechanically supports one or more elements of engine 20. Inner diffuser case 68 can be secured along radially interior case edge/flange 69 to turbine engine support structure 71 via inner support arm 70. Case 68 can also be secured to outer engine support 73 along radially outer case edge/flange 75, via outer support arm 74. This and other mounting arrangements allow case 68 to be secured axially between HPC 44 (or another compressor module) and a combustor module (such as combustor 56 shown in FIG. 1).

A plurality of diffuser case struts 78 (one shown in FIG. 2A) can be integrally formed as part of inner diffuser case 68 and in any case extend radially between first and second diffuser flowpath walls 77A, 77B. Depending on a particular engine orientation, struts 78, along with diffuser flowpath walls 77A, 77B can also extend radially between inner and outer support arms 70, 74. One or more circumferentially distributed diffuser case struts 78 and walls 77A, 77B define a first diffuser flow path 76 aligned with a core flow path defined in part by compressor EGVs 66, thereby allowing compressed air from HPC 44 to flow through diffuser case 68 and eventually toward combustor 56. Additionally and/or alternatively, inner and outer walls 77A, 77B of diffuser case 68 can be supported by EGV's 66.

Upper mixing chamber 82 can be disposed radially adjacent (e.g., radially outward of) outer support arm 74 relative to engine axis A. Generally, upper mixing chamber 82 can be defined at least in part by outer engine support structure 73 and a radially outer side of inner diffuser case 68. In the example shown in FIG. 2A, outer support arm 74 bounds a portion of upper mixing chamber 82 in conjunction with inner surface 83 of outer engine support structure 73. A second support or blocking arm 85 can also bound upper mixing chamber 82.

Upper mixing chamber 82 and cooled air heat exchanger(s) 84 can be collectively referred to as cooled air system 81. Upper mixing chamber 82 can receive cooled air 87 from one or more heat exchangers 84, and allows air 87 cooled by heat exchanger(s) 84 to mix with ambient or other air to a desired temperature. In certain embodiments, cooled air 87 may be increased in pressure by placing ambient or other air in thermal communication with air from bypass flow path B (shown in FIG. 1). In alternative embodiments, (best shown in FIG. 3), cooled air from heat exchanger(s) 84 can be ducted so that the cooled air is provided directly to first strut opening 88A without being exposed to leakage or ambient air in upper mixing chamber 82.

Within diffuser case strut 78 is at least one strut passage 86 with first strut opening 88A facing upper mixing chamber 82, and second opening 88B facing a first lower mixing chamber 92A and second lower mixing chamber 92B. Lower mixing chambers 92A, 92B can generally be defined radially inward of inner diffuser case struts 78 (relative to engine axis A). In the example of FIG. 2A, first lower mixing chamber 92A is bounded in part by inner support arm 70 serving as a first chamber wall. Second chamber wall 97 can be disposed annularly between inner support arm 70 and diffuser case struts 78. Second lower mixing chamber 92B, which can be disposed annularly between diffuser case struts 78 and first lower mixing chamber 92A, can be defined at least in part by second diffuser flowpath wall 77B and second chamber wall 97. A third chamber wall 90, which in FIG. 2A separates a downstream or aft side of diffuser case 68 from combustor 56, can also define a portion of one or both lower mixing chambers 92A, 92B. Third chamber wall 90 can also form a portion of inner support arm 70.

Figure 2:
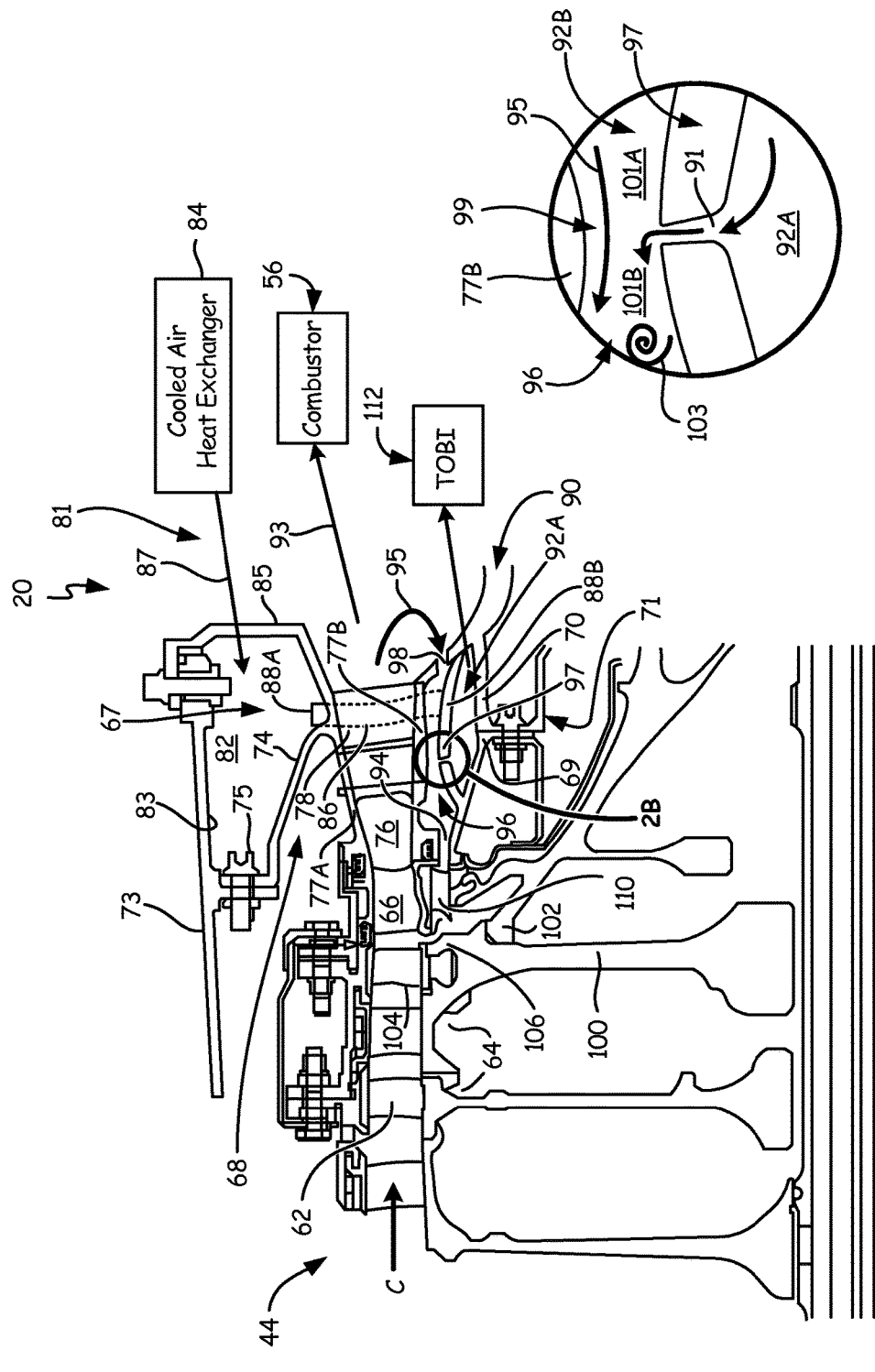
FIG. 2A schematically illustrates a portion of a high pressure compressor disposed in a gas turbine engine.
FIG. 2B is a magnified view of a portion of FIG. 2A.
Figure 3:
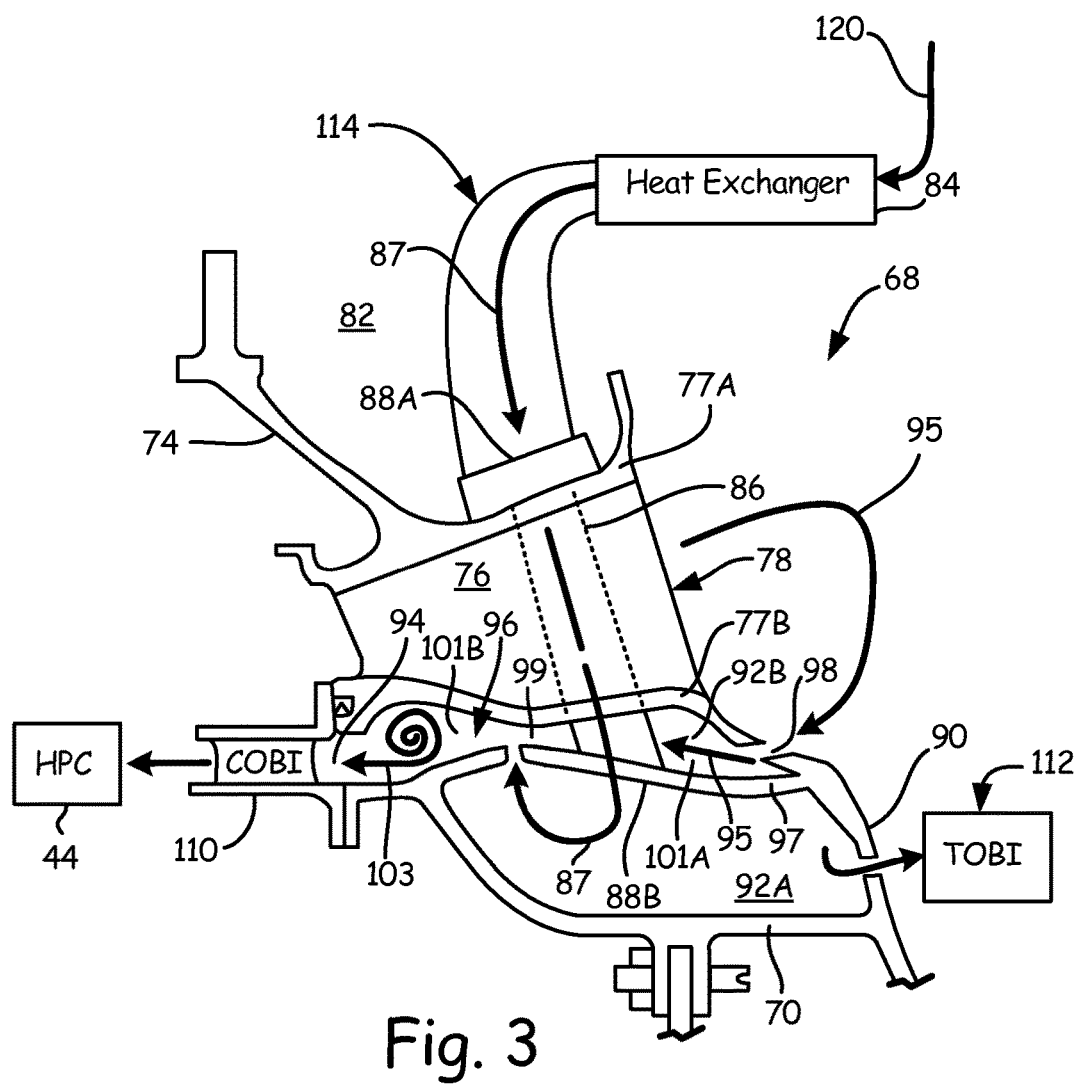
FIG. 3 shows a diffuser and venturi arrangement disposed proximate the high pressure compressor shown in FIG. 2A.

In addition to FIGS. 2A and 2B, FIG. 3 also shows an example secondary flow system 67 in operation. During operation, as seen in the various figures, compressed air is discharged from HPC 44 and passes generally axially through inner diffuser case 68 disposed axially between HPC 44 and combustor 56. Most of this compressed air is combustor inlet air 93, but a portion of this compressed air is diverted away from the core flow passage (proximate combustor 56) as secondary air 95 to enter secondary flow system 67. Some of the diverted secondary air 95 enters second lower mixing chamber 92B, which leads to compressor coolant feed passage 94. Second lower mixing chamber 92B can receive this diverted secondary air 95 via one or more circumferentially distributed bleed holes 98. Bleed holes 98 can be formed, for example, through inner support arm 70 and/or third chamber wall 90, which in certain embodiments, is one and the same.

Diverted secondary air 95 is still too hot to effectively cool overheated compressor surfaces and thus cannot directly enter compressor cooling feed passage 94. At the same time, cooled air 87 from heat exchanger(s) 84 is generally provided at a temperature required for tangential onboard injection (TOBI) system 112. However, this means that cooled air 87 is often too cold to be provided directly to HPC 44 and/or COBI 110.

In the event that air 87 directly from cooled air heat exchanger(s) 84 is too cold for the compressor rim and/or COBI 110, first lower mixing chamber 92A, located radially inward of inner diffuser case 68, allows for mixing of cooled air 87 with ambient, leakage, or other secondary air. Cooled air 87 from first lower mixing chamber 92A then is passed through bleed holes 91 in second diffuser wall 97 to join with diverted secondary air 95 to form mixed cooling air 103, before mixed cooling air 103 enters compressor coolant passage 94.

Diverted secondary air 95 is also at a relatively high pressure upon being bled into second lower mixing chamber 92B. Thus diverted secondary air 95 would normally prevent entry of cooled air 87. To avoid the need to excessively pressurize cooled air 87, second lower mixing chamber 92B includes venturi(s) 96 for passing diverted secondary air 95 therethrough. In the example shown, second chamber wall 97 and second diffuser flowpath wall 77B have facing surfaces aligned to form neck 99 between converging portion 101A and diverging portion 101B. Flowing diverted secondary air 95 through neck 99 into diverging portion 101B decreases static pressure and increases the Mach number of diverted secondary air 95, thereby allowing entry of more cooled air 87. This combination of diverted secondary air 95 and cooled air 87 then enters compressor coolant feed passage 94 as mixed air 103 toward EGV(s) 66.

Though the path of the cooling air and diverted secondary air can be circuitous, embodiments of this secondary flow system are more compact than other potential air delivery systems, particularly in the axial direction. This makes such secondary flow configurations useful for engine designs with moderate to severe axial size constraints.

In one example, mixed air 103 is delivered to compressor on board injection (COBI) system 110 (best seen in FIG. 3) to efficiently direct mixed air 103 to various compressor elements such as compressor hub 100, spacer arm 102, rotor blade attachment 104, and/or compressor rim 106, thereby cooling the same. In an alternate example, compressor coolant feed passage 94 delivers mixed air 103 directly to hub 100, spacer arm 102, rotor blade attachment 104 and/or compressor rim 106. Other combustor inlet air 93, cooled air 87, and/or mixed cooling air 103 can be routed around combustor 56 to be provided to TOBI system 112.

Cooled air system 81 which includes heat exchanger(s) 84 located radially outward of diffuser case strut 78 relative to engine axis A. Diffuser case strut(s) 78, which can be integral with diffuser case 68 each include strut passage 86 extending generally radially through diffuser case strut 78. Strut passage 86 can be in fluid engagement at first opening 88A to cooled air system 81. Here, first opening 88A is ducted to heat exchanger(s) 84 via at least one cooled air duct 114. A second opposing opening 88B of diffuser case strut 78 can be open to first lower mixing chamber 92A, which is defined radially inward of diffuser case strut 78 relative to axis A.

At least one bleed hole 98 provides flow communication for diverted secondary air to enter second lower mixing chamber 92B. Bleed holes 98 can be sized and numbered to arrive at a sufficient effective flow area for diverted secondary air 95. One or more venturis 96 are formed via first and second walls (e.g., second chamber wall 97 and/or diffuser case lower support arm 70) separating first and second lower mixing chambers 92A, 92B. These or other first and second chamber walls are shaped such that they form venturi(s) 96, with neck 99 axially between converging and diverging portions 101A, 101B. This effectively reduces static pressure downstream (here, in the engine forward direction) of diverted secondary air 95, and permits injection of low pressure cooled air 87 from first lower mixing chamber 92A.

In use, at least a portion of a compressor module such as HPC 44 can be cooled as shown in FIGS. 2A-3. Secondary or ambient air 120 is provided to a cooled air system (e.g., by passing air 120 through heat exchanger 84) disposed on a radially outer side of the compressor module. Heat exchanger(s) 84 can be in thermal communication with a quantity of fan bypass air (see, e.g., FIG. 1) which removes heat from secondary air 120 to form cooled air 87. At least a portion of cooled air 87 is directed through one or more strut passage(s) 86 extending radially through at least one diffuser case strut 78 to first lower mixing chamber 92A.

A portion of diverted secondary air 95 is bled (via bleed holes 98) into second lower mixing chamber 92B disposed radially adjacent to first lower mixing chamber 92A. Venturi(s) 96 decrease static pressure of diverted secondary air 95, while increasing its relative Mach number. This allows cooling air 87 to enter second lower mixing chamber 92B from first lower mixing chamber 92A, where the two airstreams 87, 95 form mixed air 103 which then enters compressor coolant feed passage 94.

At least a portion of mixed cooling air 103 is directed to at least one surface of a compressor module (e.g., compressor hub 100, spacer arm 102, rotor blade attachment 104, and/or compressor rim 106 shown in FIG. 2A). To efficiently utilize the energy of mixed cooling air 103, it can be directed through COBI system 110 disposed along feed passage 94. While not explicitly shown, mixing of mixed cooling air can be enhanced by one or more surface features disposed in compressor coolant feed passage 94.

Discussion of Possible Embodiments

The following are non-exclusive descriptions of possible embodiments of the present invention.

A flow system for use in a gas turbine engine includes a diffuser case strut defining a first opening at a first radial end, a second opening at a second radial end, and a strut passage radially therethrough between the first and second openings. A first chamber wall and a second chamber wall define a first mixing chamber disposed radially inward of the diffuser case strut in fluid communication with the strut passage. A third chamber wall extends between the second flowpath wall and the second chamber wall to define a second mixing chamber disposed between the diffuser case strut and the first mixing chamber. The second flowpath wall and the second chamber wall are shaped to form a venturi in the second mixing chamber.

The flow system of the preceding paragraph can optionally include, additionally and/or alternatively, any one or more of the following features, configurations and/or additional components:

A flow system according to an exemplary embodiment of this disclosure, among other possible things includes a diffuser case strut defining a first opening at a first radial end, a second opening at a second radial end, and a strut passage radially therethrough between the first and second openings; a first chamber wall and a second chamber wall defining a first mixing chamber disposed radially inward of the diffuser case strut in fluid communication with the strut passage; and a third chamber wall extending between the second flowpath wall and the second chamber wall to define a second mixing chamber disposed between the diffuser case strut and the first mixing chamber; wherein the second flowpath wall and the second chamber wall are shaped to form a venturi in the second mixing chamber, the venturi including a neck portion disposed between a converging portion and a diverging portion.

A further embodiment of the foregoing flow system, wherein the converging portion of the venturi in the second mixing chamber is configured to receive diverted secondary air.

A further embodiment of any of the foregoing flow systems, wherein the third chamber wall includes a plurality of circumferentially distributed bleed holes providing flow communication with the converging portion of the second mixing chamber.

A further embodiment of any of the foregoing flow systems, wherein the venturi includes a neck portion disposed between a converging portion and a diverging portion.

A further embodiment of any of the foregoing flow systems, wherein the second mixing chamber is in flow communication with a compressor cooling feed passage at a diverging portion of the venturi.

A further embodiment of any of the foregoing flow systems, wherein the compressor cooling feed passage is in flow communication with at least one of: a compressor hub, a compressor spacer, an exit guide vane, a compressor rotor, and a compressor rim.

A further embodiment of any of the foregoing flow systems, further comprising a compressor onboard injection (COBI) system disposed along the compressor cooling feed passage.

A further embodiment of any of the foregoing flow systems, comprising a plurality of circumferentially distributed diffuser case struts, each diffuser case strut defining a first opening at a first radial end, a second opening at a second radial end, and a strut passage radially therethrough between the first and second openings; wherein at least one of the strut passages has its first opening in flow communication with a cooled air system, and has its second end in fluid communication with the lower mixing chamber.

A further embodiment of any of the foregoing flow systems, wherein the plurality of diffuser case struts and the first and second diffuser flowpath walls define a diffuser case.

A further embodiment of any of the foregoing flow systems, wherein the diffuser case is secured to a compressor module.

A further embodiment of any of the foregoing flow systems, wherein the diffuser case is secured axially between a compressor module and a combustor module.

A further embodiment of any of the foregoing flow systems, wherein the plurality of diffuser case struts are integral with the first and second diffuser flowpath walls.

An engine includes a compressor section, a combustor section, and a turbine section defining a core flow passage. A diffuser case includes a first diffuser flowpath wall, a second diffuser flowpath wall, and a plurality of diffuser case struts positioned in the core flow passage radially between the inner and outer case supports. A secondary flow system includes a cooled air system defined radially outward of the diffuser case struts with a plurality of diffuser case strut passages extending radially through at least some of the diffuser case struts. Each strut passage has a first opening at a first radial end and a second opening at a second radial end. A first chamber wall and a second chamber wall define a first mixing chamber disposed radially inward of the diffuser case struts and in fluid communication with the strut passages. A third chamber wall extends between the second diffuser flowpath wall and the second chamber wall to define a second mixing chamber disposed between the diffuser case strut and the first mixing chamber. The second flowpath wall and second chamber wall are shaped to form a venturi in the second mixing chamber.

The engine of the preceding paragraph can optionally include, additionally and/or alternatively, any one or more of the following features, configurations and/or additional components:

An engine according to an exemplary embodiment of this disclosure, among other possible things includes a compressor section, a combustor section, and a turbine section defining a core flow passage; a diffuser case including a plurality of diffuser case struts positioned in the core flow passage radially between inner and outer case supports; and a secondary flow system including: a plurality of diffuser case strut passages extending radially through at least some of the diffuser case struts, each strut passage having a first opening at a first radial end and a second opening at a second radial end; a first chamber wall and a second chamber wall defining a first mixing chamber disposed radially inward of the diffuser case struts and in fluid communication with the strut passages; and a third chamber wall extending between the second diffuser flowpath wall and the second chamber wall to define a second mixing chamber disposed between the diffuser case strut and the first mixing chamber; wherein the second flowpath wall and the second chamber wall are shaped to form a venturi in the second mixing chamber.

A further embodiment of the foregoing engine, wherein the converging portion of the venturi in the second mixing chamber is configured to receive diverted secondary air.

A further embodiment of any of the foregoing engines, wherein the secondary air is diverted from the core flow passage via a plurality of circumferentially distributed bleed holes providing flow communication with the converging portion of the second mixing chamber.

A further embodiment of any of the foregoing engines, wherein the venturi includes a neck portion disposed between a converging portion and a diverging portion.

A further embodiment of any of the foregoing engines, wherein the second chamber wall includes a plurality of apertures providing flow communication between the first mixing chamber and the second mixing chamber.

A further embodiment of any of the foregoing engines, wherein the second mixing chamber is in flow communication with a compressor cooling feed passage at a diverging portion of the venturi. A further embodiment of any of the foregoing engines, wherein the compressor cooling feed passage is in flow communication with at least one of: a compressor hub, a compressor spacer, an exit guide vane, a compressor rotor, and a compressor rim.

A further embodiment of any of the foregoing engines, further comprising: a compressor onboard injection (COBI) system disposed along the compressor cooling feed passage.

A further embodiment of any of the foregoing engines, wherein the strut passages are also in communication with a tangential onboard injection (TOBI) system.

A further embodiment of any of the foregoing engines, further comprising: a cooled air system defined radially outward of the diffuser case struts.

Although the present invention has been described with reference to preferred embodiments, workers skilled in the art will recognize that changes may be made in form and detail without departing from the spirit and scope of the invention.

The invention claimed is:

1. A flow system for use in a gas turbine engine, the flow system comprising:
   a diffuser case comprising a plurality of diffuser case struts each extending radially through a diffuser flow path defined along a core flow path axially between a compressor module and a combustor module, at least one of the diffuser case struts defining a first opening at a first radial end in communication with a cooled air system providing cooled air at a first lower temperature, a second opening at a second radial end in communication with at least one lower mixing chamber, and a strut passage radially therethrough between the first and second openings;
   a first chamber wall and a second chamber wall defining a first lower mixing chamber disposed radially inward of the at least one diffuser case strut in fluid communication with the strut passage; and
   a third chamber wall extending between a second flowpath wall and the second chamber wall to define a second lower mixing chamber disposed between the at least one diffuser case strut and the first lower mixing chamber;
   wherein the second flowpath wall and the second chamber wall are shaped to form a venturi in the second lower mixing chamber, wherein the second lower mixing chamber is configured to also receive a portion of secondary air diverted away from the core flow path between the compressor module and the combustor module such that the diverted portion of secondary air at a second higher temperature than the first lower temperature, is combined with air from at least one of the strut passages in the second lower mixing chamber so as form mixed air at a third intermediate temperature before the mixed air enters a compressor cooling feed passage from the venturi.

2. The flow system of claim 1, wherein the third chamber wall includes a plurality of circumferentially distributed bleed holes providing flow communication with the converging portion of the second lower mixing chamber.

3. The flow system of claim 2, wherein the venturi includes a neck portion disposed between the converging portion and a diverging portion.

4. The flow system of claim 1, wherein the second chamber wall includes a plurality of apertures providing flow communication between the first lower mixing chamber and the second lower mixing chamber.

5. The flow system of claim 3, wherein an outlet of the second lower mixing chamber is in flow communication with the compressor cooling feed passage at a diverging portion of the venturi.

6. The flow system of claim 1, wherein an outlet of the compressor cooling feed passage is in flow communication with at least one of: a compressor hub, a compressor spacer, an exit guide vane, a compressor rotor, and a compressor rim.

7. The flow system of claim 1, further comprising:
   a compressor onboard injection (COBI) system disposed along the compressor cooling feed passage.

8. The flow system of claim 1, wherein at least one of the plurality of diffuser case struts is integral with the first and second flowpath walls.

9. An engine comprising:
   a compressor section, a combustor section, and a turbine section together defining a core flow passage;
   a diffuser case including a plurality of diffuser case struts each extending radially through a diffuser flow path defined along the core flow passage axially between the compressor section and the combustor section, and radially between inner and outer case supports;
   a cooled air system disposed radially outward of the diffuser case; and
   a secondary flow system including:
   a plurality of diffuser case strut passages extending radially through at least some of the diffuser case struts, each strut passage having a first opening at a first radial end and a second opening at a second radial end, at least one of the diffuser case strut passages having a first opening at a first radial end in communication with an outlet of the cooled air system, providing cooled air at a first lower temperature, and a second opening at a second radial end in communication with at least a first lower mixing chamber;
   a first chamber wall and a second chamber wall defining the first lower mixing chamber disposed radially inward of the diffuser case struts and in fluid communication with the second opening of the plurality of diffuser case strut passages; and
   a third chamber wall extending between the second diffuser flowpath wall and the second chamber wall to define a second lower mixing chamber disposed between the diffuser case and the first lower mixing chamber;
   wherein the second flowpath wall and the second chamber wall are shaped to form a venturi in the second lower mixing chamber wherein a converging portion of the venturi in the second lower mixing chamber is configured to receive secondary air diverted away from the core flow passage between the compressor section and the combustor section such that the diverted portion of secondary air is at a second higher temperature than the first lower temperature, and is combined in the second lower mixing chamber with air from at least one of the diffuser case strut passages so as form mixed air at a third intermediate temperature, before the mixed air enters a compressor cooling feed passage from the second lower mixing chamber.

10. The engine of claim 9, wherein the secondary air is diverted from the core flow passage via a plurality of circumferentially distributed bleed holes providing flow communication with the converging portion of the second mixing chamber.

11. The engine of claim 9, wherein the second chamber wall includes a plurality of apertures providing flow communication between the first lower mixing chamber and the second lower mixing chamber.

12. The engine of claim 9, wherein the second lower mixing chamber is in flow communication with the compressor cooling feed passage at a diverging portion of the venturi.

13. The engine of claim 9, wherein the compressor cooling feed passage is in flow communication with at least one of: a compressor hub, a compressor spacer, an exit guide vane, a compressor rotor, and a compressor rim.

14. The engine of claim 9, further comprising:
- a compressor onboard injection (COBI) system disposed along the compressor cooling feed passage.

\* \* \* \* \*